(12) United States Patent
Bloching et al.

(10) Patent No.: US 8,930,908 B2
(45) Date of Patent: Jan. 6, 2015

(54) ASPECT AND SYSTEM LANDSCAPE CAPABILITY-DRIVEN AUTOMATIC TESTING OF SOFTWARE APPLICATIONS

(75) Inventors: Uwe Bloching, Nussloch (DE); Stefan Rau, Dielheim (DE)

(73) Assignee: SAP SE, Walldorf (DE)

( * ) Notice: Subject to any disclaimer, the term of this patent is extended or adjusted under 35 U.S.C. 154(b) by 486 days.

(21) Appl. No.: 12/973,663

(22) Filed: Dec. 20, 2010

(65) Prior Publication Data
US 2012/0159445 A1 Jun. 21, 2012

(51) Int. Cl.
G06F 9/44 (2006.01)
G06F 11/36 (2006.01)

(52) U.S. Cl.
CPC .................................. G06F 11/3688 (2013.01)
USPC ............................. 717/124; 717/126; 717/127

(58) Field of Classification Search
None
See application file for complete search history.

(56) References Cited

U.S. PATENT DOCUMENTS

| | | | |
|---|---|---|---|
| 5,001,418 A * | 3/1991 | Posse et al. ................ 714/738 |
| 5,523,946 A * | 6/1996 | Kaplan et al. ................ 704/2 |
| 6,182,245 B1 * | 1/2001 | Akin et al. ................ 714/38.14 |
| 6,636,585 B2 * | 10/2003 | Salzberg et al. ................ 379/22 |
| 6,668,340 B1 * | 12/2003 | Baker et al. ................ 714/38.1 |
| 6,928,393 B2 * | 8/2005 | Czerwonka ................ 702/186 |
| 7,028,290 B2 * | 4/2006 | Srivastava et al. ............ 717/127 |
| 7,055,067 B2 * | 5/2006 | DiJoseph ................ 717/126 |
| 7,069,428 B2 * | 6/2006 | Miyamoto et al. ................ 713/1 |
| 7,165,074 B2 * | 1/2007 | Avvari et al. ................ 717/124 |
| 7,167,870 B2 * | 1/2007 | Avvari et al. ................ 717/124 |
| 7,178,063 B1 * | 2/2007 | Smith ................ 714/38.1 |
| 7,228,524 B2 * | 6/2007 | Bailey et al. ................ 717/100 |
| 7,275,020 B2 * | 9/2007 | Sutton ................ 702/186 |
| 7,293,257 B2 * | 11/2007 | Czerwonka ................ 717/124 |
| 7,356,432 B1 * | 4/2008 | Lang ................ 702/117 |
| 7,779,303 B2 * | 8/2010 | Stubbs et al. ................ 714/38.14 |
| 7,823,147 B2 * | 10/2010 | Moshir et al. ................ 717/173 |
| 7,877,733 B2 * | 1/2011 | Parkinson et al. ............ 717/127 |
| 7,882,493 B2 * | 2/2011 | Uehara et al. ................ 717/124 |
| 7,954,095 B2 * | 5/2011 | Archer et al. ................ 717/127 |
| 8,103,913 B2 * | 1/2012 | Zambrana ................ 717/124 |
| 8,132,155 B2 * | 3/2012 | Gvillo ................ 717/126 |
| 8,185,877 B1 * | 5/2012 | Colcord ................ 717/124 |
| 8,276,123 B1 * | 9/2012 | Deng et al. ................ 717/125 |

(Continued)

OTHER PUBLICATIONS

Xie, et al., "Detecting Redundant Unit Tests for AspectJ Programs"; 2006 IEEE; [retrieved on Aug. 15, 2014]; Retrieved from Internet <URL:http://ieeexplore.ieee.org/stamp/stamp.jsp?tp=&arnumber=4021983>;pp. 1-10.*

(Continued)

*Primary Examiner* — Xi D Chen
(74) *Attorney, Agent, or Firm* — Schwegman Lundberg & Woessner, P.A.

(57) ABSTRACT

In a system and a method, a sub-test catalog is retrieved from a test catalog repository. A test aspect of the sub-test catalog is compared to an aspect of a software application to be tested. A required system capability of the sub-test catalog is compared to the capabilities of a system landscape based on a determination that the sub-test catalog test aspect matches the aspect of the software application to be tested. The system landscape includes at least one system. The sub-test catalog is added to a master test catalog based on a determination that the required system capability of the sub-test catalog matches the system landscape capabilities.

20 Claims, 11 Drawing Sheets

(56) References Cited

U.S. PATENT DOCUMENTS

| | | | | |
|---|---|---|---|---|
| 8,296,734 | B2* | 10/2012 | Geppert et al. | 717/124 |
| 8,365,147 | B2* | 1/2013 | Grechanik et al. | 717/124 |
| 8,370,809 | B2* | 2/2013 | Lawrance et al. | 717/124 |
| 8,387,024 | B2* | 2/2013 | Urra et al. | 717/131 |
| 8,561,036 | B1* | 10/2013 | Beans et al. | 717/124 |
| 8,606,538 | B2* | 12/2013 | Cahon et al. | 717/127 |
| 8,683,446 | B2* | 3/2014 | Paradkar et al. | 717/126 |
| 8,701,092 | B1* | 4/2014 | Colcord | 717/126 |
| 8,799,869 | B2* | 8/2014 | Grechanik | 717/126 |
| 2013/0074048 | A1* | 3/2013 | Osawa et al. | 717/127 |

OTHER PUBLICATIONS

Gulbins, et al., "A Model for Functional Test Generation and Testability Analysis"; 1993 IEEE; [retrieved on Aug. 15, 2014]; Retrieved from Internet <URL:http://ieeexplore.ieee.org/stamp/stamp.jsp?tp=&arnumber=246608>;pp. 515-516.*

Hemmati, et. al., "Achieving Scalable Model-Based Testing Thruogh Test Case Diversity"; 2013 ACM; [retrieved on Aug. 15, 2014]; Retrieved from Internet <URL:http://dl.acm.org/citation.cfm?id=2430536>;pp. 6:1-6:42.*

Pava, et al., "A Self-Configuring Test Harness for Web Applications"; 2009 ACM; [retrieved on Aug. 15, 2014]; Retrieved from Internet <URL:http://dl.acm.org/citation.cfm?id=1566445>;pp. 1-6.*

* cited by examiner

ASPECT AND SYSTEM LANDSCAPE CAPABILITY-DRIVEN AUTOMATIC TESTING OF SOFTWARE APPLICATIONS

TECHNICAL FIELD

This application relates generally to the testing of software applications, and specifically, to a system and method for aspect and landscape capability-driven automatic testing of software applications.

BACKGROUND INFORMATION

Today's business applications are based on collaboration and a division of labor. The assignment of specific tasks to certain executable and reusable software components enables the creation of business applications through the composition of software components. A software component itself may be composed of sub-components or may be made of units of work that keep track of the context and take into account relationships, data, and rule-based constraints.

The set of functionality offered by an application is often not static and may depend on the capabilities offered by the set of systems that is available in a given system landscape. For example, business intelligence (BI) functionality may only be offered by an application if a BI system is available in the system landscape.

BRIEF DESCRIPTION OF THE DRAWINGS

In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

DETAILED DESCRIPTION

Various embodiments include at least one of a system, a method, and a tangible computer-readable medium with executable instructions stored thereon providing for the testing of a component-based software application distributed across multiple systems.

Some such embodiments enable a sub-test catalog to be retrieved from a test catalog repository. A test aspect of the sub-test catalog may be compared to an aspect of a software application to be tested. A required system capability of the sub-test catalog may be compared to the capabilities of a system landscape based on a determination that the sub-test catalog test aspect matches the aspect of the software application to be tested. The system landscape may include one or more systems. The sub-test catalog may be added to a master test catalog based on a determination that the required system capability of the sub-test catalog matches the system landscape capabilities.

Figure 1:
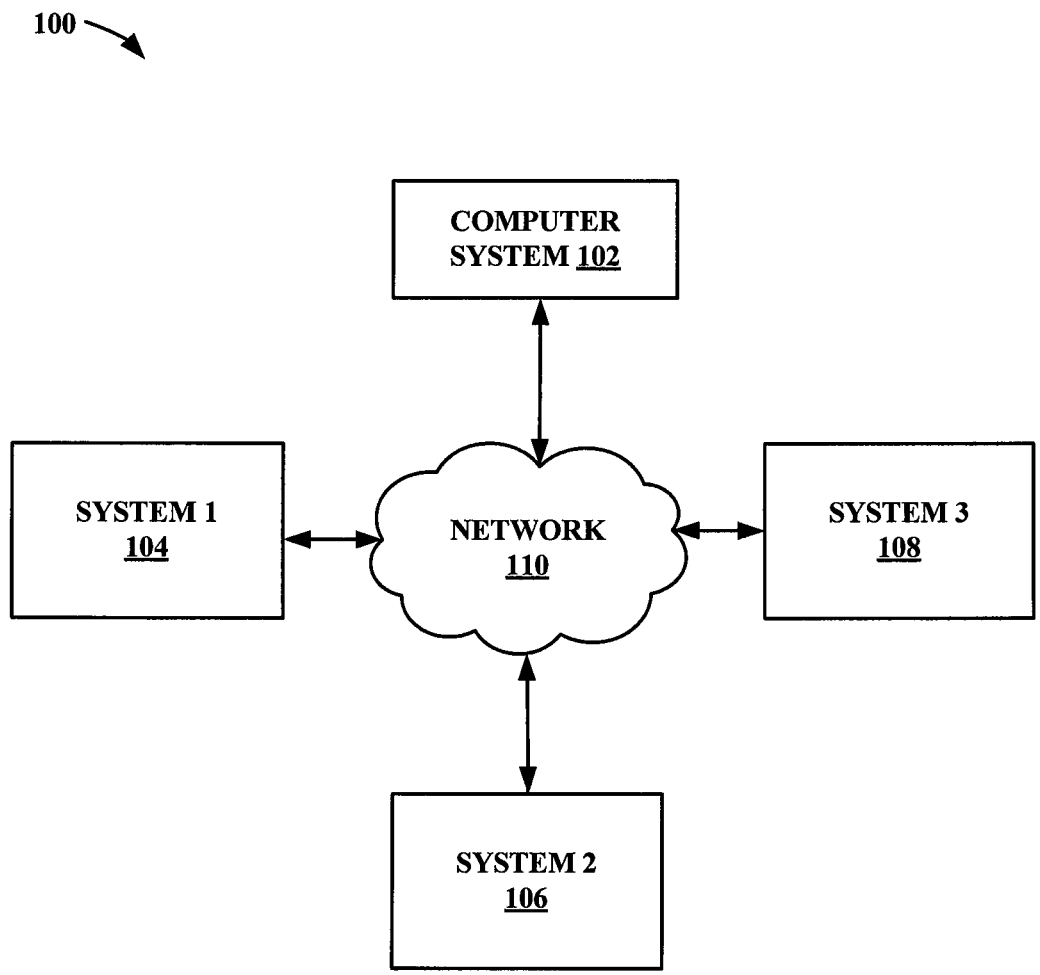
FIG. 1 is a block diagram illustrating an example embodiment of a networked environment within which a computing device may connect, via a network, with one or more systems storing application components.

FIG. 1 is a block diagram illustrating an example embodiment of a networked environment within which a computing device may connect, via a network, with one or more systems storing application components. Referring to FIG. 1, a computer system 102 may connect via a network 110 to one or more of system 1 104, system 2 106, and system 3 108. The computer system 102 may execute an application, such as an application suite, a business application, or a test application. It is contemplated that the foregoing listed applications are merely examples and that any type of application may be executed in the networked environment of FIG. 1. The application may be composed of software components stored on one or more of system 1 104, system 2 106, and system 3 108. To perform tasks and access resources, the application may call services or transmit requests to any of the systems, and the systems may communicate with each other as part of the execution or processing of the application. The location of storage for the software components comprising the application may be dependent on the capabilities of each system. For example, software components related to business intelligence may be stored on a business intelligence system.

Figure 2:
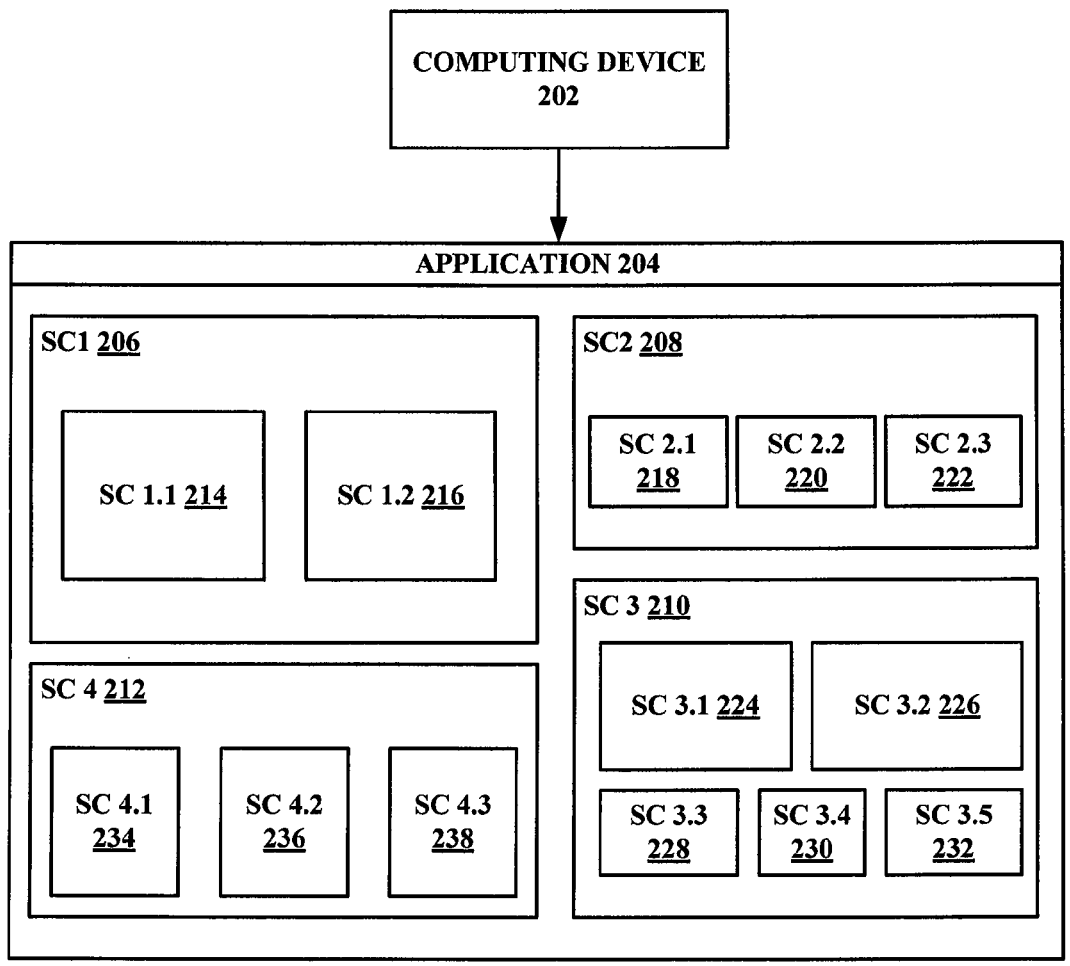
FIG. 2 is a diagram of an example embodiment of a component-based software application.

FIG. 2 is a diagram of an example embodiment of a component-based software application. Referring to FIG. 2, a component-based application is depicted. Component-based applications may exploit the fact that specific tasks that are performed in a software application may be assigned to software components designed to accomplish a well-defined set of tasks via a set of well-defined interfaces. The application that is based on such software components acts as a conductor that requests the different software components to perform specific tasks (e.g., retrieve data from a persistency layer, display data on a user interface (UI), or trigger business intelligence tasks).

In FIG. 2, application 204 may be communicatively coupled to a computing device 202 being operated by a user. In an example embodiment, application 204 may comprise four software components, denoted as SC1 206, SC2 208, SC3 210, and SC4 212. Each software component may further comprise one or more sub-components, such as SC1.1 214 and SC1.2 216 of software component SC1 206.

Together, the four software components depicted in FIG. 2 may comprise a monolithic or customized application. It is contemplated that additional customization of the application may be performed by adding software components or removing existing software components to the application 204.

Figure 3:
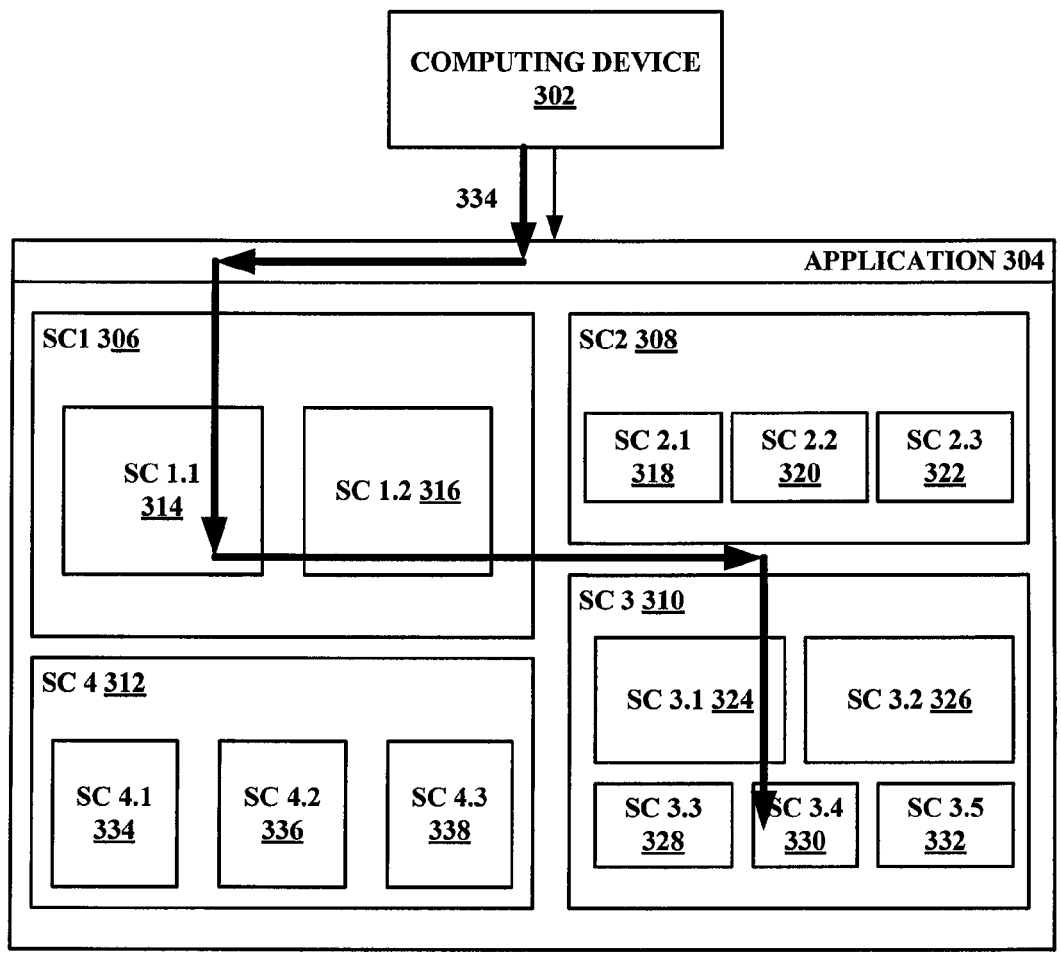
FIG. 3 is a diagram illustrating the handling of a request issued to a component-based software application in accordance with an example embodiment.

FIG. 3 is a diagram illustrating the handling of a request issued to a component-based software application in accordance with an example embodiment. As shown in the example embodiment of FIG. 3, a user may instruct a computing device 302 to issue a request to the application 304 to perform a certain task or process. As shown by the arrows 334, the task or process may be performed by calling the software components of the application 304 in a particular sequence or order. For example, the user using the computing device 302 may request the application 304 to perform a task. The application 304 may first call software component SC1 306. Software component SC1 306 may call sub-components SC1.1 314 and SC1.2 316 to perform the portion of the task assigned to software component SC1 306. Software component SC1 306 may call software component SC3 310 to perform a next step or phase of the task or process. Software component SC3 310 may call sub-components SC3.1 324 and SC3.4 330 to perform its assigned portion of the task or process. Collectively, the processing sequence may be referred to as a software component call sequence. The foregoing embodiment is merely an example. It is contemplated that any combination of software components or sub-components may be called as part of a software component call sequence.

Figure 4:
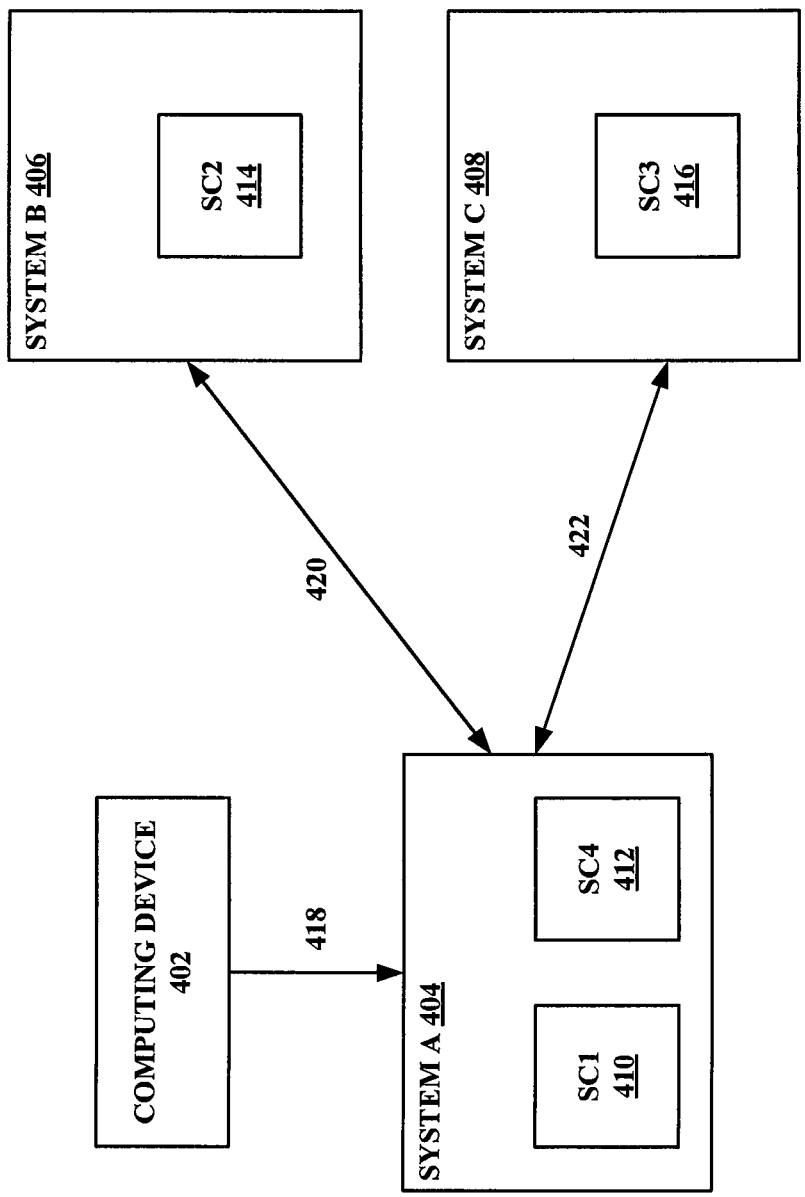
FIG. 4 is a diagram of a component-based software application distributed across multiple systems, in accordance with an example embodiment.

FIG. 4 is a diagram of a component-based software application distributed across multiple systems, in accordance with an example embodiment. Referring to FIG. 4, the concept of dividing labor by making use of the software component approach to composing applications may be extended in such a way that the software components may be assigned to different systems within a system landscape according to the capabilities provided by the different systems. Using the example software components referenced in FIGS. 2 and 3, the system landscape of FIG. 4 illustrates the distributed nature of the software components that comprise the application 304. For simplicity of illustration, the sub-components of each software component have been omitted from the system landscape diagram of FIG. 4. FIG. 4 illustrates that System A 404 may store software components SC1 410 and SC4 412. System B 406 may store software component SC2 414, and System C 408 may store software component SC3 416. System A 404 may issue requests on behalf of software components SC1 410 and SC4 412 to System B 406 and System C 408. For example, if software component SC4 412 requires a service from software component SC2, a corresponding request may be sent from System A 404 to System B 406. In this respect, the software components stored by System A 404 may be considered to make up the core of application 304 because the software components SC1 410 and SC4 412 are depicted as issuing requests to distributed software components in System B 406 and System C 408.

To ensure proper functioning, applications, such as the applications depicted in the example embodiments of FIGS. 2, 3, and 4, and their software components require testing before deployment and shipping. A test may refer to a piece of software that performs a specific test (e.g., checking whether specific business intelligence analysis features of an application function correctly). Within a networked environment or distributed system, tests may be executed on a specific system within the system landscape. In an example embodiment, to make a test independent of the technical setup of a specific system landscape, the test logic may be designed to work with logical destination names. During test runtime, a logical destination name may be resolved to a technical destination name. For example, a logical destination name "MAIN_TEST_SYSTEM" may be resolved into System A 404 of FIG. 4 in an example embodiment. However, depending on the system landscape, it is possible that the logical destination name "MAIN_TEST_SYSTEM" may translate to a different technical destination name, such as System B 406 of FIG. 4.

An application and its software components may be tested according to different aspects. For example, one type of test may concern the functional correctness of individual software components. A second type of test may concern the functional correctness concerning the interaction between a set of software components. A third type of test may concern the performance of individual software components. A fourth type of test may be an end-to-end test that concerns the overall performance of the application (e.g., interactive response times).

Each of these types of test may be referred to as an aspect-driven test. Aspect-driven tests may be expressed in terms of an aspect vector, although it is contemplated that other types of data structures, such as strings may be employed. The aspect vector may be described as a 1×m vector where m equals the number of different aspects that are relevant for testing. For example, an aspect vector may be expressed as:

Aspect vector: $(a1, a2, \ldots, an)$ with $ax=\{0, 1\}$

Each aspect may be assigned to an element ax of such a vector. An aspect having a value of '1', such that ax=1, means that aspect x is relevant. Conversely, an aspect having a value of '0', such that ax=0, means that aspect x is not relevant. For example, suppose a "Functional Correctness Test," a "Performance Test," and an "Integration Test" comprise three vectors. Encoding these aspects requires a vector of size 1×3. If the "Functional Correctness Test" is encoded with vector element a1, "Performance Test" with vector element a2, and "Integration Test" with vector element a3, then an aspect vector (1, 1, 0) may encode the aspects "Functional Correctness Test" and "Performance Test."

In addition to aspect-driven testing, an application may be tested according to the capabilities offered by a system landscape. Only the functionality supplied by the different systems in a system landscape may be tested. For example, if an application offers an additional business intelligence analysis feature and a process integration communication feature, these features may be tested only if corresponding systems that support these features exist in the system landscape. Thus, the systems and their capabilities determine the set of tests that may be executed for a given system landscape.

The different capabilities that are supplied by a specific system may be expressed as a 1×n vector where n equals the number of different capabilities that are of interest for testing. A system capability vector may be expressed as:

System Capability Vector: $(c1, c2, \ldots, cn)$ with $cx=\{0, 1\}$

Each element of the System Capability Vector may describe whether a certain capability x is available in a system (expressed as cx=1) or not (expressed as cx=0). The System Capability Vector may be obtained as a result of a System Capability Sniffing process. System Capability Sniffing entails determining the capabilities of the different systems involved in a system landscape. A System Capability Sniffer may analyze whether a specific capability is supplied by a system or not. In an example embodiment, the System Capability Sniffer may be a piece of software that retrieves detailed information about a system capability if the system being sniffed supports the capability.

Figure 5:
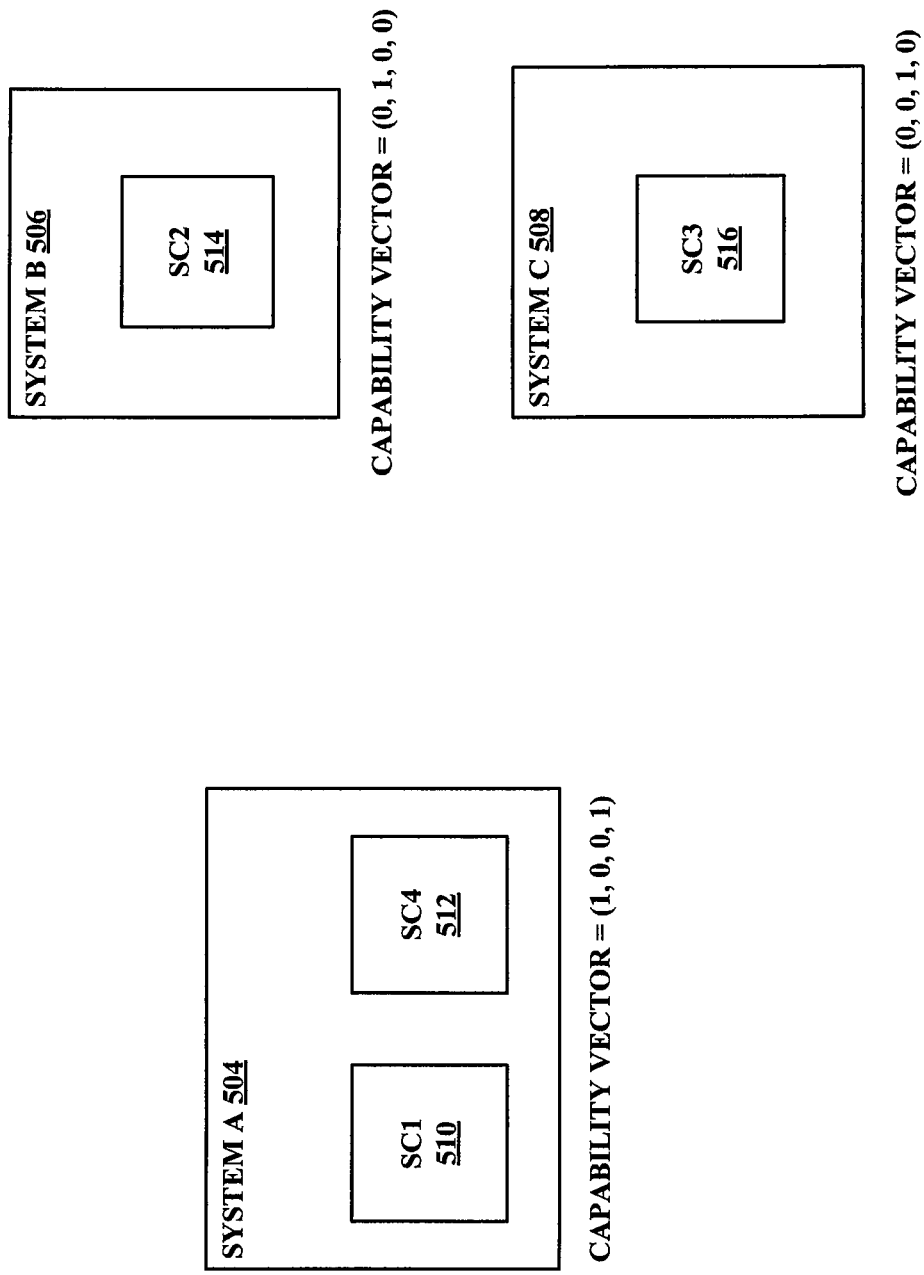
FIG. 5 is a diagram of a component-based software application distributed across multiple systems, in accordance with an example embodiment.

Referring back to the System Capability Vector, FIG. 5 illustrates a diagram of a component-based software application distributed across multiple systems, in accordance with an example embodiment. FIG. 5 contains a system landscape having three systems—System A 504, System B 506, and System C 508—with each system storing one or more software components. For the purposes of the discussion of the example embodiment of FIG. 5, the software components illustrated in FIG. 5—SC1 510, SC4 512, SC2 514, and SC3 516—may represent the different system capabilities that are relevant for testing. The System Capability Vector for the landscape system of FIG. 5 may thus be a vector having a size of 1×4. Software component SC1 510 may be encoded as vector element $c_1$, SC2 514 may be encoded as vector element $c_2$, and so forth.

Each system may be assigned a System Capability Vector that describes the capabilities supported by the system. For example, in the example embodiment of FIG. 5, System A 504 may have a System Capability Vector=(1, 0, 0, 1) that reflects that System A 504 supports software components SC1 510 and SC4 512, but not software components SC2 514 and SC3 516. Similarly, System B 506 may have a System Capability Vector=(0, 1, 0, 0) that reflects that System B 506 supports only software component SC2 514.

A System Landscape Capability Vector may describe which capabilities are provided by all systems of the landscape. The System Landscape Capability Vector may be calculated by combining the System Capability Vectors with a Boolean OR operation. For example, the System Landscape Capability Vector may be expressed as Vector of System A (1, 0, 0, 1) OR Vector of System B (0, 1, 0, 0) OR Vector of System C (0, 0, 1, 0), with the result being Landscape Vector: (1, 1, 1, 1). In certain example embodiments, multiple systems may overlap in terms of system capabilities, but such a scenario may be handled by the use of the previously mentioned logical destination name to identify which system is to be tested.

Tests that are to be executed on a system landscape also may be expressed in terms of a vector called a Required System Capabilities Vector Mask. The logical structure of the vector mask may be the same as that of the System Capability Vector and the System Landscape Capability Vector. Using the Required System Capabilities Vector Mask, a determination may be made as to whether a system landscape provides every capability required by a test catalog (e.g., a group of tests). The determination may be expressed as a logical AND operation of the System Landscape Capability Vector and the Required System Capabilities Vector Mask. If the result of the logical AND operation is equal to the value of the Required System Capabilities Vector Mask, then all capabilities requested by the test catalog are supplied by the system landscape. An example of the logical AND operation may be expressed as:

System Landscape Capability Vector: (1, 1, 1, 0, 1, 0, 1, 1)

AND

Required System Capabilites Vector Mask: (0, 1, 1, 0, 1, 0, 1, 0) =

(0, 1, 1, 0, 1, 0, 1, 0)

As previously discussed, a test catalog may be used to test the system landscape. A test catalog may be a grouping of tests that logically belong together. In an example embodiment, the test catalog may be structured such that the basic building blocks of the software components are first tested, followed by the testing of higher software layers.

The master test catalog may contain sub-test catalogs that may include subsequent sub-test catalogs. A sub-test catalog may be a grouping of tests that logically belong together. Example embodiments of types of tests that may be contained in a sub-test catalog include prerequisite tests that may verify whether the required systems of the system landscape are available and unit tests that test the core functionality of an application that is tested with the tests in the sub-test catalog. A test catalog may be executed, meaning that all tests defined in the test catalog will be started in a defined sequence. In an example embodiment, the sequence of execution of the tests defined in the test catalog may be the sequence in which the tests appear.

A master test catalog may be a test catalog that contains a set of sub-test catalogs. The master test catalog may be customized by selectively assembling sub-test catalogs into the master test catalog in a predetermined order.

Figure 6:
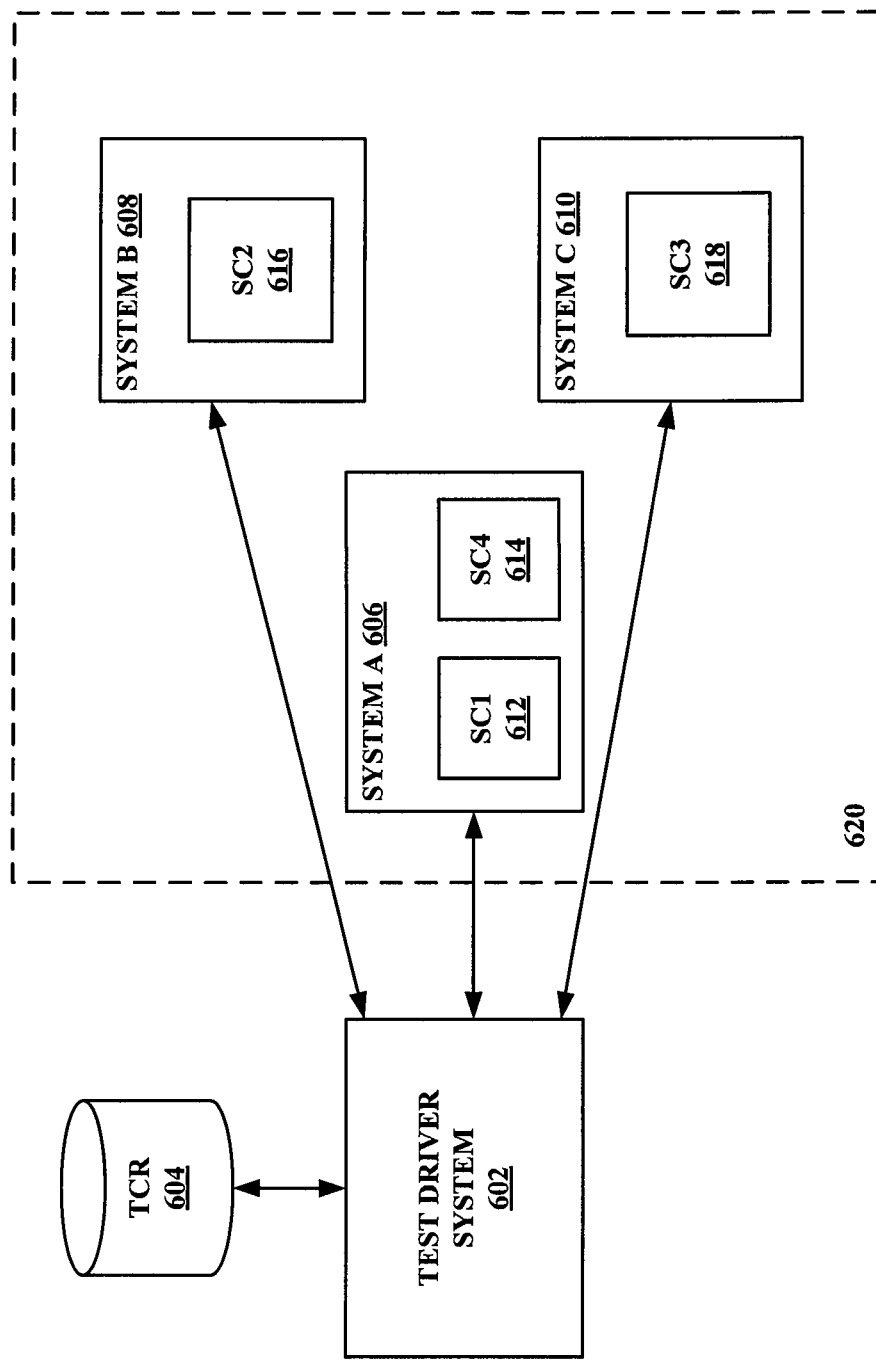
FIG. 6 is a diagram of a test runtime environment for testing a component-based software application distributed across multiple systems, in accordance with an example embodiment.

FIG. 6 is a diagram of a test runtime environment for testing a component-based software application distributed across multiple systems, in accordance with an example embodiment. A Test Driver System 602 may maintain sub-test catalogs and master test catalogs, trigger execution of the tests, and verify the results of the test catalog executions. The Test Driver System 602 may be communicatively coupled to a Test Catalog Repository (TCR) 604 that stores and maintains the sub-test catalogs and master test catalogs used for testing. As part of the execution of test catalogs, the Test Driver System 602 may communicate with a testing environment 620, which in an example embodiment, may include each of System A 606, System B 608, and System C 610, to test the software components maintained therein, respectively.

Prior to the creation and execution of a master test catalog, the test environment is prepared. One aspect of preparation is the definition of which aspects and capabilities may be tested by a sub-test catalog. The definition may be implemented by assigning a sub-test catalog to a tuple that consists of an aspect vector and a Required Capability Vector Mask. The Required Capability Vector Mask may describe the set of capabilities that is required for starting the tests of a sub-test catalog. An example tuple is shown below.

| Aspect Vector | Required System Capabilities Vector Mask | Sub-Test Catalog |
|---|---|---|
| (0, 1, 0, . . . , 1) | (1, 1, 0, . . . , 1, 0) | STC1 |
| (0, 1, 0, . . . , 0) | (1, 0, 0, . . . , 0, 1) | STC2 |
| . . . | . . . | . . . |
| (1, 1, 0, . . . , 0) | (1, 1, 1, . . . , 0, 0) | STCn |

It is possible that different sub-test catalogs may share the same tuple. Therefore, there may be multiple entries for the same tuple but different sub-test catalogs in that list.

A second aspect of test environment preparation may be a determination of the set of capabilities provided by the different systems of the system landscape. This determination may be performed by a System Capability Sniffer executed on each system. Each sniffer may return a System Capability Vector. The System Capability Vectors for each system may be assembled together to create a System Landscape Capability Vector. The sniffer itself may be a software program that is able to detect what capabilities are available in a system. Such capabilities may be detected, for example, by checking the configuration data of a system. The sniffers may be executed or triggered on each individual system by the Test Driver System 602. The Test Driver System 602 may receive the System Capability Vectors and assemble them into the System Landscape Capability Vector.

Figure 7:
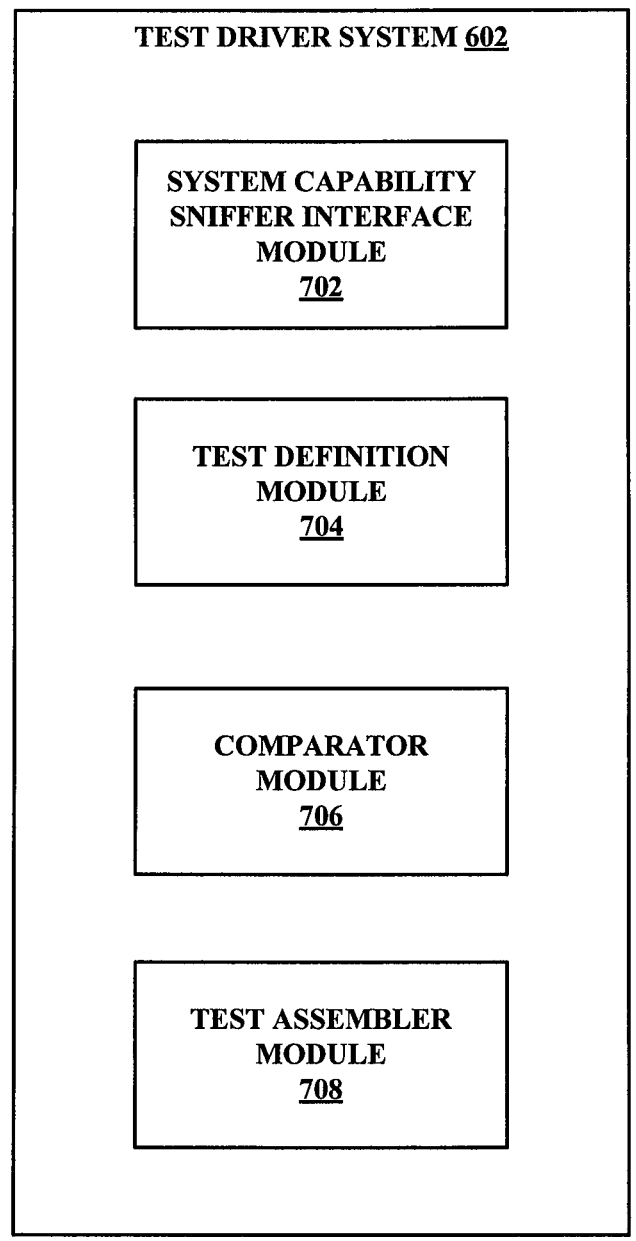
FIG. 7 illustrates a block diagram of a Test Driver System in accordance with an example embodiment.

FIG. 7 illustrates a block diagram of a Test Driver System in accordance with an example embodiment. The Test Driver System 602 may include a System Capability Sniffer Interface Module 702, a Test Definition Module 704, a Comparator Module 706, and a Test Assembler Module 708. Each of the modules illustrated in FIG. 7 may be implemented or executed by one or more processors contained in the Test Driver System 602.

A System Capability Sniffer Interface Module 702 may instruct or trigger sniffer software programs on systems of the system landscape to execute. The System Capability Sniffer Interface Module 702 may communicate with the sniffer programs via a network interface (not shown) and over a network. Each sniffer software program may determine the capabilities of the system in which the sniffer program resides. The System Capability Sniffer Interface Module 702 may receive a System Capability Vector from each sniffer program that identifies the capabilities of the system being sniffed.

A Test Definition Module 704 may define which aspects and capabilities may be tested by a sub-test catalog. The Test Definition Module 704 may define which aspects are to be tested for a software application and embody these aspects in an aspect vector. The Test Definition Module 704 also may retrieve a Required Capability Vector Mask for a sub-test catalog from a Test Catalog Repository 604 via a database interface (not shown). The Required Capability Vector Mask may define the set of capabilities required to be supported by the system landscape in order to execute a particular sub-test catalog.

A Comparator Module 706 may receive the aspect vectors and Required Capability Vector Masks from the Test Definition Module 704 and compare these vectors to a System Landscape Capability Vector provided by the System Capability Sniffer Interface Module 702 to determine which sub-test catalogs should be selected from a Test Catalog Repository 604 for inclusion in a master test catalog. As will be described in more detail below, a series of comparisons may be performed to determine which aspect is to be tested, which sub-test catalog requirements are satisfied by the system landscape capabilities, and which sub-test catalogs should be included in the master test catalog.

A Test Assembler Module 708 may receive the results of the comparisons from the Comparator Module 706 and may add those sub-test catalogs that satisfy the comparisons to a master test catalog. The Test Assembler Module 708 further may order the sub-test catalogs in the master test catalog in an execution order.

Figure 8:
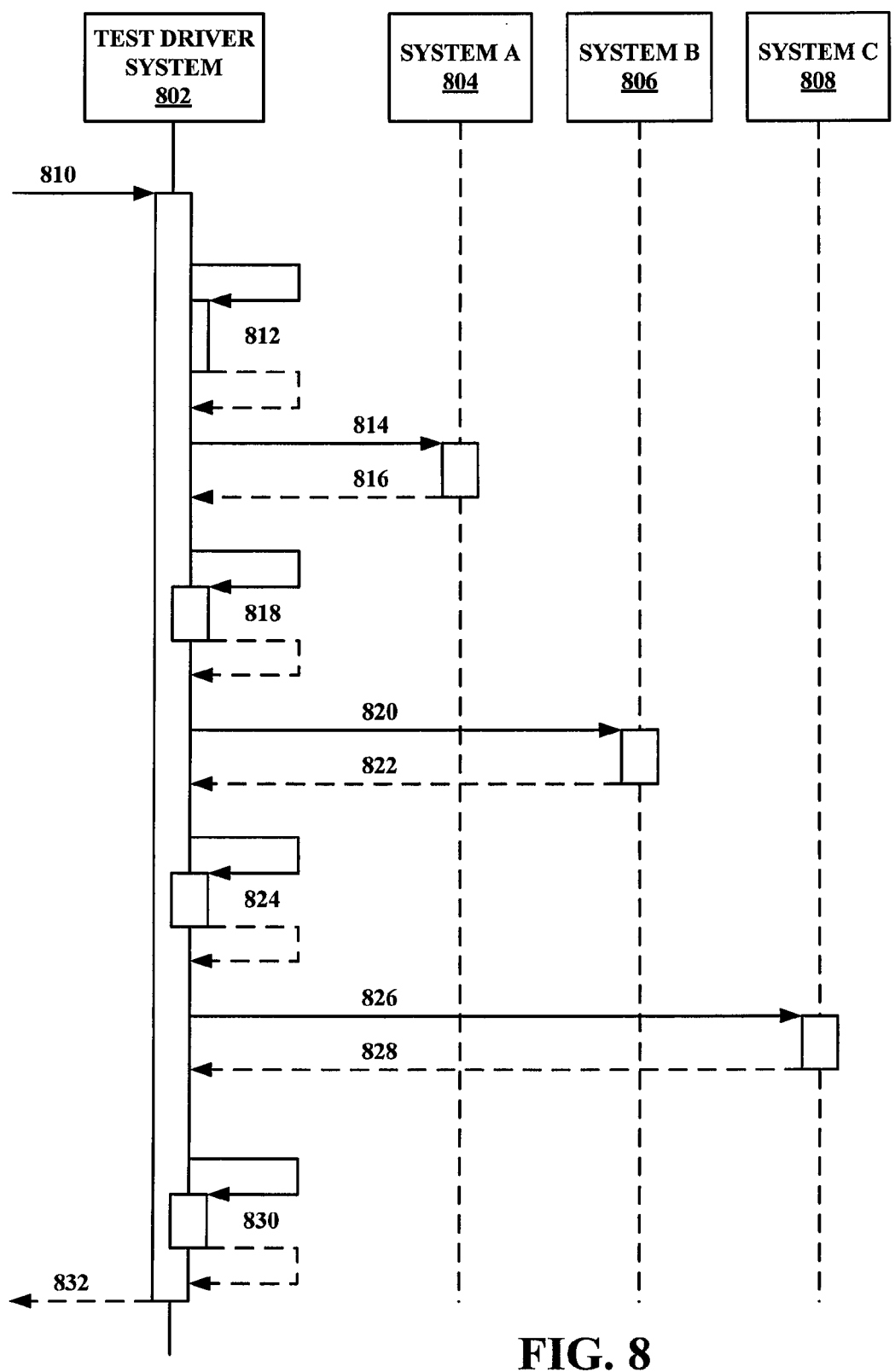
FIG. 8 is a diagram of interactions between a test system and systems storing software application components, in accordance with an example embodiment.

FIG. 8 illustrates a diagram of interactions between a test system and systems storing software application components, in accordance with an example embodiment. The Test Driver System 802 may receive a command 810 to be sniffing the capabilities of the systems found in the system landscape. The Test Driver System 802 may first reset the System Landscape Capability Vector 812. A sniffer may be executed 814 on System A 804 to determine the capabilities of System A 804. A System Capability Vector may be returned 816 to the Test Driver System 802. The System Landscape Capability Vector may be updated with the capabilities of System A 804 during interaction 818. Updating the System Landscape Capability Vector may entail performing a logical OR operation on the System Landscape Capability Vector and the System Capability Vector for System A 804.

The Test Driver System 802 may proceed to execute a sniffer 820 for System B 806 and to receive a System Capability Vector 822 from System B 806. System Landscape Capability Vector may be updated with the capabilities contained in the System Capability Vector for System B 806 during interaction 824. Similarly, the Test Driver System 802 may execute a sniffer 826 for System C 808 and may receive a System Capability Vector 828 from System C 808. The System Landscape Capability Vector may be updated with the capabilities contained in the System Capability for System C 808 during interaction 830. A finalized System Landscape Capability Vector may be returned during interaction 832.

A master catalog may be created following the preparation of the test environment. The Test Driver System 602 of FIG. 6 may use an algorithm to assemble a set of sub-test catalogs into a master catalog. First, the Test Driver System 602 may clear the master test catalog. The Test Driver System 602 may next compare an aspect vector of a sub-test catalog stored in the Test Catalog Repository 604 with an aspect vector that describes the aspects to be tested. In an example embodiment, the comparison may take the form of a logical AND operation. The result of the comparison may be compared to an initial aspect vector. If the comparison is not zero, a second comparison is performed between a System Landscape Capability Vector and a Required System Capabilities Vector Mask of the sub-test catalog. In an example embodiment, the second comparison may take the form of a logical AND operation. The result of the comparison may be compared to the Required System Capabilities Vector Mask of the sub-test catalog to determine if the capabilities of the system support the sub-test catalog. If the capabilities of the system support the test catalog, the sub-test catalog may be added to the master test catalog.

Figure 9:
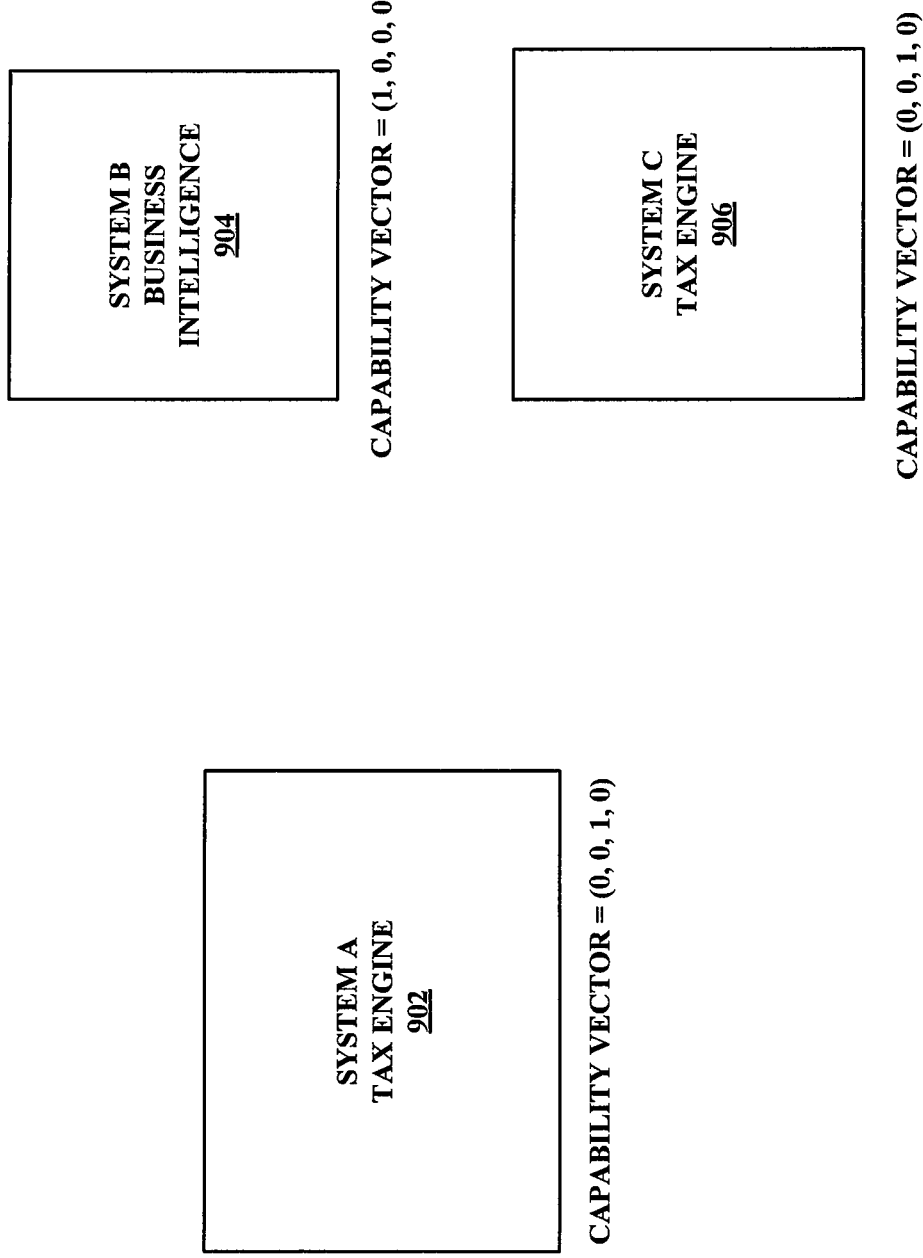
FIG. 9 illustrates a diagram of interactions between a test system and systems storing software application components, in accordance with an example embodiment.

FIG. 9 illustrates a diagram of a component-based software application distributed across multiple systems, in accordance with an example embodiment. The system landscape of the example embodiment of FIG. 9 may be a test environment for an application. In setting up an example test, the Test Driver System may define the test environment as follows:

| | Meaning |
|---|---|
| Aspect Vector Value | |
| (1, 0, 0) | Functional Correctness Test |
| (0, 1, 0) | Performance Test |
| (0, 0, 1) | Integration Test |
| Capability Vector Value | |
| (1, 0, 0, 0) | Business Intelligence services available |
| (0, 1, 0, 0) | Communication services available |
| (0, 0, 1, 0) | Tax Calculation Engine available |
| (0, 0, 0, 1) | Search Engine available |

| Aspect | Required System Capabilities Vector Mask | Sub-Test Catalog |
|---|---|---|
| (1, 0, 0) | (1, 0, 0, 0) | STC_BI_FUNCTIONAL_CORRECTNESS_TESTS |
| (1, 0, 0) | (0, 1, 0, 0) | STC_COMM_FUNCTIONAL_CORRECTNESS_TESTS |

-continued

| Aspect | Required System Capabilities Vector Mask | Sub-Test Catalog |
|---|---|---|
| (1, 0, 0) | (0, 0, 1, 0) | STC_TAXCALC_FUNCTIONAL_CORRECTNESS_TESTS |
| (1, 0, 0) | (0, 0, 0, 1) | STC_SEARCH_FUNCTIONAL_CORRECTNESS_TESTS |
| (0, 1, 0) | (0, 1, 0, 0) | STC_COMM_PERFORMANCE_TESTS |
| (0, 1, 0) | (0, 0, 0, 1) | STC_SEARCH_PERFORMANCE_TESTS |
| (0, 1, 0) | (0, 0, 1, 0) | STC_TAXCALC_PERFORMANCE_TESTS |
| (0, 0, 1) | (1, 0, 1, 0) | STC_BI_AND_TAX_INTEGRATION_TESTS |

Referring to FIG. 9, the system landscape illustrates that business intelligence and tax engine capabilities are available. The System Landscape Capability Vector thus may be calculated as (1, 0, 1, 0). In an example embodiment, if the Test Driver System 602 performs functional correctness tests, the aspect vector may be (1, 0, 0) according to the test environment setup described above. Applying the aspect vector to the test environment reveals that two types of functional correctness tests may be performed.

| Aspect | Required System Capabilities Vector Mask | Sub-Test Catalog |
|---|---|---|
| (1, 0, 0) & (1, 0, 0) = (1, 0, 0) | (1, 0, 0, 0) & (1, 0, 1, 0) = (1, 0, 0, 0) | Match for STC_BI_FUNCTIONAL_CORRECTNESS_TESTS |
| (1, 0, 0) & (1, 0, 0) = (1, 0, 0) | (0, 1, 0, 0) & (1, 0, 1, 0) = (0, 0, 0, 0) | STC_COMM_FUNCTIONAL_CORRECTNESS_TESTS—no match |
| (1, 0, 0) & (1, 0, 0) = (1, 0, 0) | (0, 0, 1, 0) & (1, 0, 1, 0) = (0, 0, 1, 0) | Match for STC_TAXCALC_FUNCTIONAL_CORRECTNESS_TESTS |
| (1, 0, 0) & (1, 0, 0) = (1, 0, 0) | (0, 0, 0, 1) & (1, 0, 1, 0) = (0, 0, 0, 0) | STC_SEARCH_FUNCTIONAL_CORRECTNESS_TESTS—no match |
| (1, 0, 0) & (1, 0, 0) = (0, 0, 0) | (0, 1, 0, 0) | STC_COMM_PERFORMANCE_TESTS—no match |
| (1, 0, 0) & (1, 0, 0) = (0, 0, 0) | (0, 0, 0, 1) | STC_SEARCH_PERFORMANCE_TESTS—no match |
| (1, 0, 0) & (1, 0, 0) = (0, 0, 0) | (0, 0, 1, 0) | STC_TAXCALC_PERFORMANCE_TESTS—no match |
| (1, 0, 0) & (1, 0, 0) = (0, 0, 0) | (1, 0, 1, 0) | STC_BI_AND_TAX_INTEGRATION_TESTS—no match |

The sub-test catalogs STC_BI_FUNCTIONAL_CORRECTNESS_TESTS and STC_TAXCALC_FUNCTIONAL_CORRECTNESS_TESTS both satisfy the aspect vector and the system capabilities vector mask. Thus, the master test catalog will include these two sub-test catalogs and no other sub-test catalogs.

Figure 10:
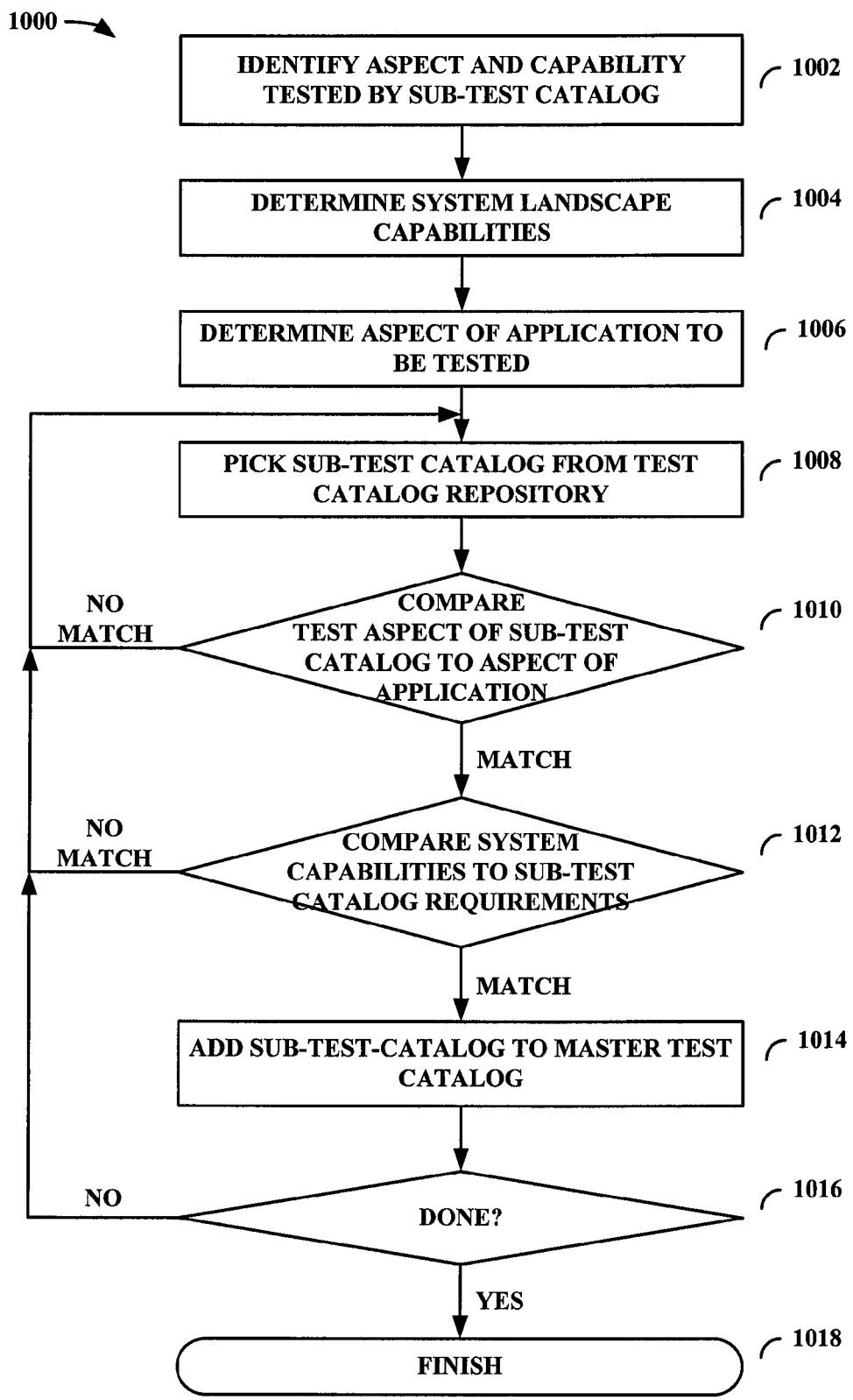
FIG. 10 illustrates an example method for automatically creating a master test catalog to test a software application based on the aspects to be tested and the capabilities of the system in which the software application resides.

FIG. 10 illustrates an example method for automatically creating a master test catalog to test a software application based on the aspects of the application to be tested and the capabilities of the system(s) in which the software application resides. At operation 1002, for each sub-test catalog, it may be determined what aspect of a software application the sub-test catalog tests and what capabilities are required by the system in order for the sub-test catalog to successfully execute. In an example embodiment, an aspect vector may be generated that represents the aspects of a software application the sub-test catalog tests. A second vector representing the capabilities of the system that are required to execute the sub-test catalog may be generated. The aspect and required system capabilities determinations may be stored in a test catalog repository with the sub-test catalog or in a test driver system that selects the tests to be executed.

At operation 1004, the capabilities of the system landscape may be determined. In an example embodiment, a test driver system may instruct or trigger a sniffer software application in each system of the system landscape to assess the capability of the system. In an example embodiment, the sniffer application may examine the configuration data of the system to determine the capabilities of the system. Each sniffer software application may generate a System Capabilities Vector that describes what capabilities each system possesses. Each sniffer software application may return the System Capabilities Vector to the test driver system, where the vectors are aggregated and a system landscape capability is determined. In an example embodiment, the system landscape may be expressed as a vector.

At operation 1006, a determination may be made as to what aspect of a software application is to be tested. The determination may be made automatically, or may be the result of user input. For example, it may be determined that the business intelligence functionality of the software application is to be tested.

At operation 1008, a sub-test catalog may be selected from a test catalog repository or other storage device that stores available tests. In an example embodiment, the test driver system may not have knowledge of a specific sub-test catalog to select. Instead, the test driver system may arbitrarily retrieve a stored sub-test catalog and determine whether to include it in a master test catalog.

At operation 1010, the test driver system may compare the aspect vector of the selected sub-test catalog to the aspect of the application being tested. The test driver system thus may be able to eliminate certain sub-test catalogs from consideration if the aspect of the application that they test does not comport with the desired application aspect to be tested. Thus, if the comparison does not yield a match, the example method may return to operation 1008 to select a different sub-test catalog for consideration.

If the comparison between the aspect vector of the selected sub-test catalog and the aspect of the application being tested yields a match, the example method may proceed to operation 1012. At operation 1012, the system landscape capabilities determined in operation 1004 may be compared to the required system capabilities for the sub-test catalog. If the comparison does not yield a match, the system landscape may lack the capabilities needed to execute the sub-test catalog. In this case, the example method may return to operation 1008 to select a different sub-test catalog.

If the comparison does yield a match, then the system landscape does support the capabilities needed to execute the sub-test catalog. At operation 1014, the sub-test catalog may be added to the master test catalog. In an example embodiment, the sub-test catalogs may be ordered by the test driver system in a desired execution sequence.

At operation 1016, a determination is made as to whether the master test catalog is complete and whether additional sub-test catalogs should be evaluated. If additional sub-test catalogs are to be evaluated, the example method may return to operation 1008 to select a different sub-test catalog. If the test driver system is complete, the example method finishes at operation 1018.

Modules, Components and Logic

Certain embodiments are described herein as including logic or a number of components, modules, or mechanisms. A component or a module is a non-transitory and tangible unit capable of performing certain operations and may be configured or arranged in a certain manner. In example embodiments, one or more computer systems (e.g., a standalone, client or server computer system) or one or more components of a computer system (e.g., a processor or a group of processors) may be configured by software (e.g., an application or application portion) as a component that operates to perform certain operations as described herein.

In various embodiments, a component or a module may be implemented mechanically or electronically. For example, a component or a module may comprise dedicated circuitry or logic that is permanently configured (e.g., as a special-purpose processor) to perform certain operations. A component or a module also may comprise programmable logic or circuitry (e.g., as encompassed within a general-purpose processor or other programmable processor) that is temporarily configured by software to perform certain operations. It will be appreciated that the decision to implement a component or a module mechanically, in dedicated and permanently configured circuitry, or in temporarily configured circuitry (e.g., configured by software) may be driven by cost and time considerations.

Accordingly, the term "component" or "module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which components or modules are temporarily configured (e.g., programmed), each of the components or modules need not be configured or instantiated at any one instance in time. For example, where the components or modules comprise a general-purpose processor configured using software, the general-purpose processor may be configured as respective different components or modules at different times. Software may accordingly configure a processor, for example, to constitute a particular component or module at one instance of time and to constitute a different component or module at a different instance of time.

Components or modules can provide information to, and receive information from, other components or modules. Accordingly, the described components or modules may be regarded as being communicatively coupled. Where multiple of such components or modules exist contemporaneously, communications may be achieved through signal transmission (e.g., over appropriate circuits and buses) that connect the components or modules. In embodiments in which multiple components or modules are configured or instantiated at different times, communications between such components or modules may be achieved, for example, through the storage and retrieval of information in memory structures to which the multiple components or modules have access. For example, one component or module may perform an operation, and store the output of that operation in a memory device to which it is communicatively coupled. A further component or module may then, at a later time, access the memory device to retrieve and process the stored output. Components or module may also initiate communications with input or output devices, and can operate on a resource (e.g., a collection of information).

Example Machine Architecture and
Machine-Readable Medium

Figure 11:
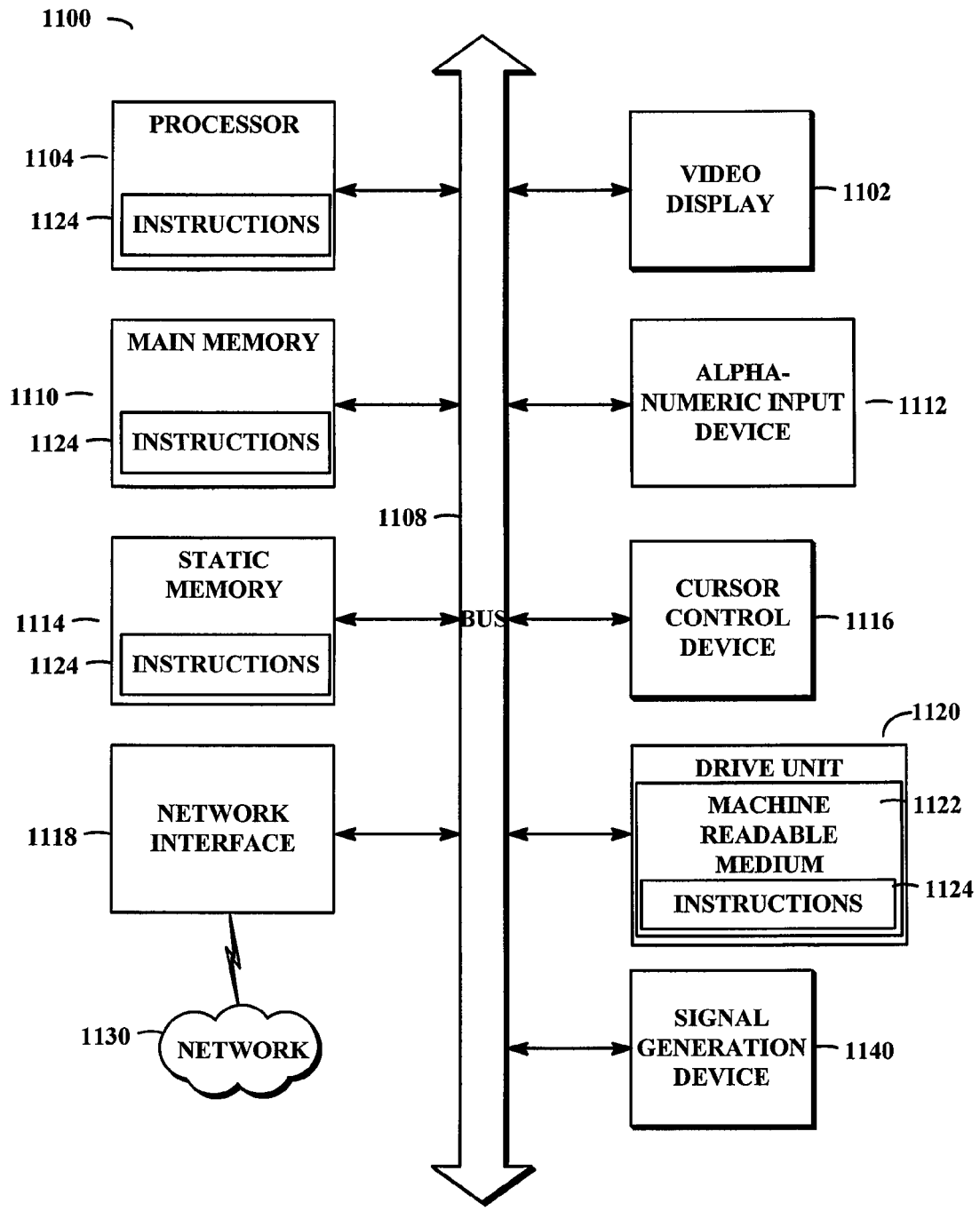
FIG. 11 illustrates a diagrammatic representation of machine in the example form of a computer system within which a set of instructions, for causing the machine to perform any one or more of the methodologies discussed herein, may be executed.

FIG. 11 illustrates a diagrammatic representation of machine in the example form of a computer system within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client device or machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1100 includes at least one processor 1104 (e.g., a central processing unit (CPU), a graphics processing unit (GPU) or both), a main memory 1110 and a static memory 1114, which communicate with each other via a bus 1108. The computer system 1100 may further include a video display unit 1102 (e.g., a liquid crystal display (LCD) or a cathode ray tube (CRT)). The computer system 1100 also includes an alphanumeric input device 1112 (e.g., a keyboard), a user interface (UI) navigation device 1116 (e.g., a mouse), a disk drive unit 1120, a signal generation device 1140 (e.g., a speaker) and a network interface device 1118.

The disk drive unit 1120 includes a machine-readable medium 1122 on which is stored one or more sets of instructions and data structures (e.g., software 1124) embodying or utilized by any one or more of the methodologies or functions described herein. The software 1124 may also reside, completely or at least partially, within the main memory 1110 and/or within the processor 1104 during execution thereof by the computer system 1100, the main memory 1110 and the processor 1104 also constituting machine-readable media.

While the machine-readable medium 1122 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible or non-transitory medium that is capable of storing, encoding or carrying instructions for execution by the machine and that cause the machine to perform any one or more of the methodologies of the disclosure, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example, semiconductor memory devices, e.g., EPROM, EEPROM, and flash memory devices; magnetic disks such as internal hard disks and removable disks; magneto-optical disks; and CD-ROM and DVD-ROM disks.

Transmission Medium

The software 1124 may further be transmitted or received over a communications network 1130 using a transmission medium. The software 1124 may be transmitted using the network interface device 1118 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., Wi-Fi and WiMax networks). The term "transmission medium" shall be taken to include any intangible medium that is capable of storing, encoding or carrying instructions for execution by the machine, and includes digital or analog communications signals or other intangible medium to facilitate communication of such software.

Example Three-Tier Software Architecture

In some embodiments, the described methods may be implemented using one of a distributed or non-distributed software application designed under a three-tier architecture paradigm. Under this paradigm, various parts of computer code (or software) that instantiate or configure components or modules may be categorized as belonging to one or more of these three tiers. Some embodiments may include a first tier as an interface (e.g., an interface tier). Further, a second tier may be a logic (or application) tier that performs application processing of data inputted through the interface level. The logic tier may communicate the results of such processing to the interface tier, and/or to a backend, or storage tier. The processing performed by the logic tier may relate to certain rules, or processes that govern the software as a whole. A third, storage tier, may be a persistent storage medium, or a non-persistent storage medium. In some cases, one or more of these tiers may be collapsed into another, resulting in a two-tier architecture, or even a one-tier architecture. For example, the interface and logic tiers may be consolidated, or the logic and storage tiers may be consolidated, as in the case of a software application with an embedded database. The three-tier architecture may be implemented using one technology, or, a variety of technologies. The example three-tier architecture, and the technologies through which it is implemented, may be realized on one or more computer systems operating, for example, as a standalone system, or organized in a server-client, peer-to-peer, distributed or so some other suitable configuration. Further, these three tiers may be distributed between more than one computer systems as various components.

Components

Example embodiments may include the above-described tiers, and processes or operations about constituting these tiers may be implemented as components. Common to many of these components is the ability to generate, use, and manipulate data. The components, and the functionality associated with each, may form part of standalone, client, server, or peer computer systems. The various components may be implemented by a computer system on an as-needed basis. These components may include software written in an object-oriented computer language such that a component oriented, or object-oriented programming technique can be implemented using a Visual Component Library (VCL), Component Library for Cross Platform (CLX), Java Beans (JB), Java Enterprise Beans (EJB), Component Object Model (COM), Distributed Component Object Model (DCOM), or other suitable technique.

Software for these components may further enable communicative coupling to other components (e.g., via various Application Programming interfaces (APIs)), and may be compiled into one complete server, client, and/or peer software application. Further, these APIs may be able to communicate through various distributed programming protocols as distributed computing components.

Distributed Computing Components and Protocols

Some example embodiments may include remote procedure calls being used to implement one or more of the above-described components across a distributed programming environment as distributed computing components. For example, an interface component (e.g., an interface tier) may form part of a first computer system that is remotely located from a second computer system containing a logic component (e.g., a logic tier). These first and second computer systems may be configured in a standalone, server-client, peer-to-peer, or some other suitable configuration. Software for the components may be written using the above-described object-oriented programming techniques, and can be written in the same programming language, or a different programming language. Various protocols may be implemented to enable these various components to communicate regardless of the programming language used to write these components. For example, a component written in C++ may be able to communicate with another component written in the Java programming language through utilizing a distributed computing protocol such as a Common Object Request Broker Architecture (CORBA), a Simple Object Access Protocol (SOAP), or some other suitable protocol. Some embodiments may include the use of one or more of these protocols with the various protocols outlined in the Open Systems Interconnection (OSI) model, or Transmission Control Protocol/Internet Protocol (TCP/IP) protocol stack model for defining the protocols used by a network to transmit data.

A System of Transmission Between a Server and Client

Example embodiments may use the OSI model or TCP/IP protocol stack model for defining the protocols used by a network to transmit data. In applying these models, a system of data transmission between a server and client, or between peer computer systems may for example include five layers comprising: an application layer, a transport layer, a network layer, a data link layer, and a physical layer. In the case of software, for instantiating or configuring components, having a three-tier architecture, the various tiers (e.g., the interface, logic, and storage tiers) reside on the application layer of the TCP/IP protocol stack. In an example implementation using the TCP/IP protocol stack model, data from an application residing at the application layer is loaded into the data load field of a TCP segment residing at the transport layer. This TCP segment also contains port information for a recipient software application residing remotely. This TCP segment is loaded into the data load field of an IP datagram residing at the network layer. Next, this IP datagram is loaded into a frame residing at the data link layer. This frame is then encoded at the physical layer, and the data transmitted over a network such as an internet, Local Area Network (LAN), Wide Area Network (WAN), or some other suitable network. In some cases, internet refers to a network of networks. These networks may use a variety of protocols for the exchange of data, including the aforementioned TCP/IP, and additionally ATM, SNA, SDI, or some other suitable protocol. These networks may be organized within a variety of topologies (e.g., a star topology), or structures.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The preceding technical disclosure is intended to be illustrative, and not restrictive. For example, the above-described embodiments (or one or more aspects thereof) may be used in combination with each other. Other embodiments will be apparent to those of skill in the art upon reviewing the above description. The scope of the claims should, therefore, be determined with reference to the appended claims, along with the full scope of equivalents to which such claims are entitled.

In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

In this document, the terms "a" or "an" are used, as is common in patent documents, to include one or more than one. In this document, the term "or" is used to refer to a nonexclusive or, such that "A or B" includes "A but not B," "B but not A," and "A and B," unless otherwise indicated. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

The Abstract is provided to comply with 37 C.F.R. §1.72(b), which requires that it allow the reader to quickly ascertain the nature of the technical disclosure. The abstract is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

What is claimed is:

1. A computer-implemented method comprising:
retrieving a sub-test catalog from a test catalog repository, the sub-test catalog comprising a plurality of tests, each of the plurality of tests configured to test one or more aspects of a software application, a description of each of the one or more aspects of the software application to be tested by each of the plurality of tests being included in a set of descriptions of test aspects of the sub-test catalog;
comparing, by at least one processor, the set of descriptions of test aspects of the sub-test catalog to a description of an aspect of a software application to be tested;
based on a determination that one of the set of descriptions of test aspects of the sub-test catalog corresponds to the description of the aspect of the software application to be tested, comparing, by the at least one processor, a description of a required system capability of the sub-test catalog to a set of descriptions of capabilities of a system landscape, the system landscape comprising at least one system; and
based on a determination that the description of the required system capability of the sub-test catalog corresponds to one of the set of descriptions of capabilities of the system landscape, adding the sub-test catalog to a master test catalog for the software application to be tested.

2. The computer-implemented method of claim 1, further comprising:
   determining the set of capabilities of the system landscape; and
   identifying the aspect of the software application to be tested.

3. The computer-implemented method of claim 2, wherein the determining of the set of capabilities of the system landscape comprises:
   instructing a sniffer software application to inspect the capabilities of the at least one system of the system landscape;
   receiving at least one vector representing the capabilities of the at least one system of the system landscape; and
   combining the at least one vector to form a system landscape capabilities vector.

4. The computer-implemented method of claim 3, wherein the sniffer software application inspects the capabilities of the at least one system by examining configuration information of the at least one system.

5. The computer-implemented method of claim 3, wherein the combining of the at least one vector comprises performing a logical OR operation on the at least one vector to form the system landscape capabilities vector.

6. The computer-implemented method of claim 1, further comprising determining the one of the set of descriptions of test aspects of the sub-test catalog and the required system capability of the sub-test catalog.

7. The computer-implemented method of claim 1, further comprising assembling the sub-test catalog and additional selected sub-test catalogs in the master test catalog in an execution order.

8. The computer-implemented method of claim 1, wherein the set of descriptions of test aspects of the sub-test catalog is embodied in a first vector, wherein the aspect of the application to be tested is embodied in a second vector, and wherein the comparing of the test aspect of the sub-test catalog to the aspect of the software application to be tested comprises:
   performing a logical AND operation on the first vector and the second vector; and
   verifying a result of the logical AND operation is not zero.

9. The computer-implemented method of claim 1, wherein the description of the required system capability of the sub-test catalog is embodied in a first vector, wherein the set of descriptions of system landscape capabilities is embodied in a second vector, and wherein the comparing of the description of the required system capability of the sub-test catalog to the set of descriptions of system landscape capabilities comprises:
   performing a logical AND operation on the first vector and the second vector; and
   comparing a result of the logical AND operation with the first vector representing the required system capability of the sub-test catalog.

10. The computer-implemented method of claim 1, wherein the system landscape comprises a plurality of systems and components of the software application to be tested are distributed across the plurality of systems of the system landscape.

11. A non-transitory machine-readable medium storing a set of instruction that, when executed by at least one processor, causes the at least one processor to perform operations, comprising:
   retrieving a sub-test catalog from a test catalog repository, the sub-test catalog comprising a plurality of tests, each of the plurality of tests configured to test one or more aspects of a software application, a description of each of the one or more aspects of the software application to be tested by each of the plurality of tests being included in a set of test aspects of the sub-test catalog;
   comparing, by at least one processor, the set of descriptions of test aspects of the sub-test catalog to a description of an aspect of a software application to be tested;
   based on a determination that one of the set of descriptions of test aspects of the sub-test catalog corresponds to the description of the aspect of the software application to be tested, comparing, by the at least one processor, a description of a required system capability of the sub-test catalog to a set of descriptions of capabilities of a system landscape, the system landscape comprising at least one system; and
   based on a determination that the description of the required system capability of the sub-test catalog corresponds to one of the set of descriptions of capabilities of the system landscape, adding the sub-test catalog to a master test catalog for the software application to be tested.

12. The non-transitory machine-readable medium of claim 11, further comprising:
   determining the set of capabilities of the system landscape; and
   identifying the aspect of the software application to be tested.

13. The non-transitory machine-readable medium of claim 12, wherein the determining of the set of capabilities of the system landscape comprises:
   instructing a sniffer software application to inspect the capabilities of the at least one system of the system landscape;
   receiving at least one vector representing the capabilities of the at least one system of the system landscape; and
   combining the at least one vector to form a system landscape capabilities vector.

14. The non-transitory machine-readable medium of claim 13, wherein the sniffer software application inspects the capabilities of the at least one system by examining configuration information of the at least one system.

15. The non-transitory machine-readable medium of claim 13, wherein the combining of the at least one vector comprises performing a logical OR operation on the at least one vector to form the system landscape capabilities vector.

16. The non-transitory machine-readable medium of claim 11, further comprising determining the one of the set of descriptions of test aspects of the sub-test catalog and the required system capability of the sub-test catalog.

17. The non-transitory machine-readable medium of claim 11, further comprising assembling the sub-test catalog and additional selected sub-test catalogs in the master test catalog in an execution order.

18. The non-transitory machine-readable medium of claim 11, wherein the set of descriptions of test aspects of the sub-test catalog is embodied in a first vector, wherein the aspect of the application to be tested is embodied in a second vector, and wherein the comparing of the test aspect of the sub-test catalog to the aspect of the software application to be tested comprises:
   performing a logical AND operation on the first vector and the second vector; and
   verifying a result of the logical AND operation is not zero.

19. The non-transitory machine-readable medium of claim 11, wherein the description of the required system capability of the sub-test catalog is embodied in a first vector, wherein the set of descriptions of system landscape capabilities is embodied in a second vector, and wherein the comparing of description of the required system capability of the sub-test catalog to the set of descriptions of system landscape capabilities comprises:

performing a logical AND operation on the first vector and the second vector; and comparing a result of the logical AND operation with the first vector representing the required system capability of the sub-test catalog.

20. A system comprising:

a test definition module configured to:

retrieve a sub-test catalog from a test catalog repository, the sub-test catalog comprising a plurality of tests, each of the plurality of tests configured to test one or more aspects of a software application, a description of each of the one or more aspects of the software application to be tested by each of the plurality of tests being included in a set of descriptions of test aspects of the sub-test catalog;

a comparator module configured to:

compare the set of descriptions of test aspects of the sub-test catalog to a description of an aspect of a software application to be tested; and based on a determination that one of the set of descriptions of test aspects of the sub-test catalog corresponds to the description of the aspect of the software application to be tested, compare a description of a required system capability of the sub-test catalog to a set of descriptions of capabilities of a system landscape, the system landscape comprising at least one system; and a test assembler module configured to:

based on a determination that the description of the required system capability of the sub-test catalog corresponds to one of the set of descriptions of capabilities of the system landscape, add the sub-test catalog to a master test catalog for the software application to be tested.

\* \* \* \* \*